(12) United States Patent
Kimura et al.

(10) Patent No.: US 9,777,193 B2
(45) Date of Patent: Oct. 3, 2017

(54) THERMOSENSITIVE ADHESIVE LABEL AND LABELED CONTAINER WITH THE SAME

(75) Inventors: Kazuyuki Kimura, Ibaraki (JP); Hiromitsu Tamauchi, Ibaraki (JP)

(73) Assignee: YUPO CORPORATION, Tokyo (JP)

( * ) Notice: Subject to any disclaimer, the term of this patent is extended or adjusted under 35 U.S.C. 154(b) by 0 days.

(21) Appl. No.: 12/967,715

(22) Filed: Dec. 14, 2010

(65) Prior Publication Data

US 2011/0159220 A1 Jun. 30, 2011

Related U.S. Application Data

(63) Continuation-in-part of application No. 12/704,552, filed on Feb. 12, 2010, now abandoned.

(30) Foreign Application Priority Data

Dec. 25, 2009 (JP) .................................. 2009-294395

(51) Int. Cl.
*B32B 1/02* (2006.01)
*C09J 7/02* (2006.01)
(Continued)

(52) U.S. Cl.
CPC .............. *C09J 7/0203* (2013.01); *B32B 7/12* (2013.01); *B32B 27/08* (2013.01); *B32B 27/20* (2013.01);
(Continued)

(58) Field of Classification Search
CPC ....... B32B 27/08; B32B 27/20; B32B 27/306; B32B 27/32; B32B 7/12; B32B 2307/31;
(Continued)

(56) References Cited

U.S. PATENT DOCUMENTS

2003/0031861 A1 2/2003 Reiter et al.
2005/0186371 A1* 8/2005 Kimura et al. .............. 428/35.2
(Continued)

FOREIGN PATENT DOCUMENTS

EP 1055715 11/2000
EP 1327671 7/2003
(Continued)

OTHER PUBLICATIONS

Search report from E.P.O. that issued with respect to patent family member European Patent Application No. 10196878.2, mail date is Jun. 28, 2011.
(Continued)

*Primary Examiner* — Lee E Sanderson
(74) *Attorney, Agent, or Firm* — Greenblum & Bernstein, P.L.C.

(57) ABSTRACT

A thermosensitive adhesive label comprising a laminate film of a first film layer and a second film layer, and a thermosensitive adhesive layer on the surface of the second film layer side of the laminate, wherein the Bekk smoothness of the surface of the first film layer side of the laminate film is from 2000 to 20000 seconds, the Bekk smoothness of the surface of the second film layer side of the laminate film is from 800 to 20000 seconds, the contact angle with water of the surface of the second film layer side of the laminate film is from 20 to 80°, and the surface strength of the thermosensitive adhesive layer is from 0.6 to 1.8 kg-cm.

11 Claims, 3 Drawing Sheets

(51) Int. Cl.
| | |
|---|---|
| *G09F 3/10* | (2006.01) |
| *B32B 7/12* | (2006.01) |
| *B32B 27/08* | (2006.01) |
| *B32B 27/20* | (2006.01) |
| *B32B 27/30* | (2006.01) |
| *B32B 27/32* | (2006.01) |

(52) U.S. Cl.
CPC ............ *B32B 27/306* (2013.01); *B32B 27/32* (2013.01); *C09J 7/0296* (2013.01); *G09F 3/10* (2013.01); *B32B 2307/31* (2013.01); *B32B 2439/00* (2013.01); *B32B 2519/00* (2013.01); *C09J 2201/162* (2013.01); *C09J 2201/61* (2013.01); *C09J 2203/334* (2013.01); *Y10T 428/13* (2015.01); *Y10T 428/1317* (2015.01); *Y10T 428/1352* (2015.01); *Y10T 428/249955* (2015.04); *Y10T 428/2817* (2015.01)

(58) Field of Classification Search
CPC ... B32B 2439/00; C09J 7/0203; C09J 7/0296; C09F 3/10; Y10T 428/13; Y10T 428/1317; Y10T 428/1352; Y10T 428/249955; Y10T 428/2817
USPC ............... 428/195, 343, 515, 523, 323, 221, 428/212–216, 347, 34.7, 34.4, 35.7, 341, 428/43, 121–124; 283/81
See application file for complete search history.

(56) References Cited

U.S. PATENT DOCUMENTS

2009/0155569 A1* 6/2009 Yamaguchi et al. .......... 428/323
2009/0169780 A1* 7/2009 Kimura et al. .............. 428/34.1
2009/0291257 A1 11/2009 Shiina et al.
2010/0126991 A1 5/2010 Kimura et al.

FOREIGN PATENT DOCUMENTS

| EP | 1865482 | 12/2007 |
|---|---|---|
| JP | 62-21835 | 2/1980 |
| JP | 63-172784 | 7/1988 |
| JP | 64-22290 | 1/1989 |
| JP | 5-018433 | 3/1993 |
| JP | 6-100847 | 4/1994 |
| JP | 6-100848 | 4/1994 |
| JP | 6-179855 | 6/1994 |
| JP | 7-319390 | 12/1995 |
| JP | 8-058755 | 3/1996 |
| JP | 8-076690 | 3/1996 |
| JP | 11-321831 | 11/1999 |
| JP | 11323287 A * | 11/1999 |
| JP | 2000-025725 | 1/2000 |

OTHER PUBLICATIONS

Japan Tappi (Japan Technical Association of the Pulp and Paper Industry, Test Method for Pulp and Paper), No. 51-87, Bristow Method, Aug. 1, 1987.
English language Abstract of JP 64-056480, corresponding to JP 5-018433, Mar. 3, 1989.
English language Abstract of JP 55-016055, corresponding to JP 62-21835, Feb. 4, 1980.
Japanese Notice of Allowance for JP2010-276644, mailed Mar. 25, 2015.

* cited by examiner

Before forming the
thermosensitive adhesive layer

After forming the
thermosensitive adhesive layer

THERMOSENSITIVE ADHESIVE LABEL AND LABELED CONTAINER WITH THE SAME

CROSS-REFERENCE TO RELATED APPLICATIONS

The present application is a continuation-in-part of U.S. patent application Ser. No. 12/704,552, filed on Feb. 12, 2010, and claims the benefit of priority from Japanese Patent Application No. 294395/2009, filed on Dec. 25, 2009, the contents of which are herein incorporated by reference in their entireties.

BACKGROUND OF THE INVENTION

Field of the Invention

The present invention relates to a thermosensitive adhesive label excellent in printability and satisfying both excellent anti-blocking property after printing and excellent peelability from the object with the label stuck thereto.

Description of the Related Art

These days much used are plastic containers such as polyethylene terephthalate (PET) bottles for sale of water, refreshing drinks, etc; and a label printed with the trade name, the design and the information data relating to the contents thereof is often stuck to such containers. For the label, used is a known pressure-sensitive adhesive label, or proposed is a thermosensitive adhesive label (delayed label) in which the back of the substrate sheet is coated with a thermosensitive adhesive agent not adhesive at room temperature (10 to 30° C.) and the opposite face thereof is printed (e.g., JP-B 5-18433, and JP-A 1-22290, 6-100847, 6-100848, 7-319390, 8-76690).

The thermosensitive adhesive label of the type becomes adhesive when the adhesive layer part thereof is heated while the label is stuck to a container, and therefore, before use, it is not adhesive and has the advantage of storability with no use of release paper indispensable for pressure-sensitive adhesive labels. Once the thermosensitive adhesive exhibits adhesiveness by heating, it may keep the adhesiveness for a given length of time even after the heating is stopped, and therefore has the advantage of especially excellent sticking stability.

However, the thermosensitive adhesive label is stored generally as a roll, and especially in summer, it becomes adhesive during storage and therefore causes a problem of blocking. To solve the problem, proposed is a method of adding an anti-blocking additive to the adhesive agent for the thermosensitive adhesive label to thereby make the label have an anti-blocking property, or a thermosensitive adhesive prepared with a plasticizer or a lubricant added thereto (e.g., JP-A 6-179855, JP-B 62-21835).

However, the label with the adhesive to which the above-mentioned additive is added has problems in that the adhesion strength thereof is low and the paste may remain on the object after peeling of the label from it since the adhesive layer strength is low.

SUMMARY OF THE INVENTION

In consideration of the prior-art problems as above, an object of the present invention is to provide a thermosensitive adhesive label excellent in anti-blocking property, and excellent in peelability from objects and in printability.

The present inventors have assiduously studied and, as a result, have found that the thermosensitive adhesive label mentioned below can solve the above-mentioned problems.

[1] A thermosensitive adhesive label comprising a laminate film of a first film layer and a second film layer, and a thermosensitive adhesive layer on the surface of the second film layer side of the laminate film, wherein the Bekk smoothness of the surface of the first film layer side of the laminate film is from 2000 to 20000 seconds, the Bekk smoothness of the surface of the second film layer side of the laminate film is from 800 to 20000 seconds, the contact angle with water of the surface of the second film layer side of the laminate film is from 20 to 80°, and the surface strength of the thermosensitive adhesive layer is from 0.6 to 1.8 kg-cm.

[2] The thermosensitive adhesive label of [1], wherein the surface of the first film layer side of the laminate film is printable.

[3] The thermosensitive adhesive label of [1] or [2], wherein the liquid absorption volume, as measured according to "Japan TAPPI No. 51:2000", of the second film layer is from 1.0 to 5.5 ml/m$^2$.

[4] The thermosensitive adhesive label of any one of [1] to [3], wherein the first film layer comprises from 40 to 100% by weight of a thermoplastic resin and from 0 to 60% by weight of at least one of an inorganic fine powder and an organic filler, and the second film layer comprises from 28 to 57% by weight of a thermoplastic resin and from 43 to 72% by weight of an inorganic fine powder surface-treated with surface-treating agent.

[5] The thermosensitive adhesive label of [4], wherein the surface-treating agent comprises at least one of a water-soluble cationic copolymer and a water-soluble anionic surfactant.

[6] The thermosensitive adhesive label of any one of [1] to [5], wherein the thermosensitive adhesive layer comprises a thermoplastic resin, a tackifier, and a solid plasticizer.

[7] The thermosensitive adhesive label of any one of [1] to [6], wherein the thermosensitive adhesive layer is activated to become flowable and adhesive when it is heated to a temperature of from 70 to 150° C.

[8] The thermosensitive adhesive label of any one of [1] to [7], wherein the second film layer is porous, and the thermosensitive adhesive layer is formed on the surface of the second film layer side of the laminate film in the state that a part of the thermosensitive adhesive layer contained in the thermosensitive adhesive layer is absorbed into the inside of the second film layer.

[9] The thermosensitive adhesive label of any one of [1] to [8], wherein the adhesive strength at peeling is from 0 to 200 gf/15 mm in which the adhesive strength at peeling is measured by preparing 20 sheets of samples by cutting the thermosensitive adhesive label to the size of 80 mm length and 15 mm width, stacking these 20 sheets of samples in such a manner that the surface of the first film layer of one sample is kept in contact with the surface of the thermosensitive adhesive layer of the adjacent sample to give a laminate, storing the laminate for 24 hours in an environment at a temperature of 50° C. and a relative humidity of 50% with a load of 500 g/cm$^2$ applied from the lowermost surface and the uppermost surface of the laminate, picking out the set of the eighth sample and the ninth sample from the uppermost surface, the set of the tenth sample and the eleventh sample and the set of twelfth sample and thirteenth sample while the two samples forming each set are in contact, fixing each of the two samples of each set by chucks of a tensile tester, measuring the adhesive strength of each sample at a pulling speed of 50 mm/min, and averaging the measured data.

[10] The thermosensitive adhesive label of any one of [1] to [9], wherein the first film layer has a multilayer structure.

[11] A labeled container with the thermosensitive adhesive label of any one of [1] to [10] stuck thereto.

[12] The labeled container of [11], wherein the container is made of high-density polyethylene, polypropylene, polyethylene terephthalate, steel, aluminum, glass or ceramics.

[13] The labeled container of [11] or [12], wherein the container is made of polyethylene terephthalate and the peeling strength of the label in peeling thereof from the container is from 200 to 500 gf/15 mm.

The thermosensitive adhesive label of the invention is free from a trouble of blocking in label storage and is excellent in labeler applicability, and in addition, it can be adhered to an object at a sufficient adhesion strength; and after use, it can be readily peeled away from the object with no paste residue left on the object. In addition, the adhesive layer can be formed simultaneously in one process of printing, and therefore, the label can be produced at low cost.

Figure 1:
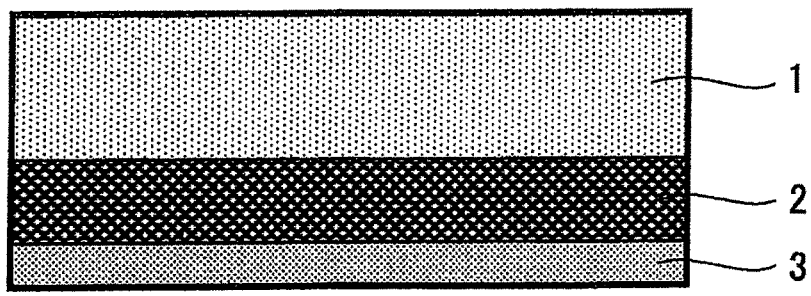
FIG. 1 is a cross-sectional view of an embodiment of the thermosensitive adhesive label

In the drawings, 1 denotes the first film layer, 2 denotes the second film layer, 3 denotes the thermosensitive adhesive layer, 4 denotes pore, 11 denote aluminum angle, 12 denotes holder, 13 denote press lever, 14 denotes nut, 15 denotes latch, 16 denotes pointer, 17 denotes mount for aluminum angle, 18 denotes leaf spring, 19 denotes holder for preparation of sample, 20 denote cellophane tape, 21 denotes thermosensitive adhesive layer, 22 denotes second film layer, 23 denotes first film layer, and 24 denotes hammer.

BEST MODE FOR CARRYING OUT THE INVENTION

The thermosensitive adhesive label of the invention is described in detail hereinunder. The description of the constitutive elements of the invention given hereinunder is for some typical embodiments of the invention, to which, however, the invention should not be limited.

In this description, the numerical range expressed by the wording "a number to another number" means the range that falls between the former number indicating the lowermost limit of the range and the latter number indicating the uppermost limit thereof. The term "blocking" refers to the state that two or more thermosensitive adhesive labels before use are stuck together to form a block or block-like state due to development of adhesiveness of a thermosensitive adhesive in the thermosensitive adhesive label by activation. The term "sticking stability" refers to the property that, for a few days after activation of a thermosensitive adhesive, the adhesiveness of the activated thermosensitive adhesive lasts and the label having the adhesive can be stably stuck to a container. The term "labeler" may be also called "labeling machine" and refers to an automated machine for sticking a label to a various kinds of objects such as a container. The term "labeler applicability" refers to the property of a thermosensitive adhesive label that can prevent a labeler treating a roll of the label from being inoperative due to blocking of the label whereby abnormal tension is applied between a part where the label is drawn out from the label roll and a part where the label is taken up. The term "labelability" refers to appropriate adhesion strength of a label to an object. When the adhesion strength is too low, the label tends to be peeled off from the container easily. When the adhesion strength is too high, the label tends to be hardly peeled from the container.

[Thermosensitive Adhesive Label]
(Characteristics)

The thermosensitive adhesive label of the invention comprises a laminate film of a first film layer 1 and a second film layer 2, and comprises a thermosensitive adhesive layer 3 on the surface of the second film layer (FIG. 1). The Bekk smoothness of the surface of the first film layer side of the laminate film is from 2000 to 20000 seconds, preferably from 5000 to 10000 seconds. The Bekk smoothness of the surface of the second film layer side of the laminate film is from 800 to 20000 seconds, preferably from 4000 to 8000 seconds, and the contact angle with water of the surface of the second film layer side of the laminate film is from 20 to 80°, preferably from 30 to 60°. The surface strength of the thermosensitive adhesive layer is from 0.6 to 1.8 kg-cm, preferably from 0.8 to 1.2 kg-cm. Preferably, the surface of the first film layer side of the laminate film is printable. Preferably, the liquid absorption volume, as measured according to "Japan TAPPI No. 51:2000", of the second film layer is from 1.0 to 5.5 ml/m$^2$, preferably from 1.5 to 5.0 ml/m$^2$.

When the smoothness of the surface of the first film layer side of the laminate film is less than 2000 seconds, then the dot gain in printing may increase and the printed image may be smudgy and blurred. On the other hand, when the smoothness is more than 20000 seconds, then only slight surface rubbing may produce remarkable scratches on the printed surface therefore detracting from the printed image. When the smoothness of the surface of the second film layer side is less than 800 seconds, then the thermosensitive adhesive could not be applied thereon thinly and uniformly, and coating unevenness may occur and the label could not have stable adhesion strength. When the smoothness is more than 20000 seconds, then the label could not have a sufficient surface strength and therefore, the second film layer may partly remain on the surface of the object in peeling the label therefrom.

For controlling the smoothness of the surface of the first film layer side of the laminate film, there may be employed a method of controlling the amount of the inorganic fine powder and the organic filler to be added to the first film layer or regulating the temperature in stretching.

When the contact angle with water of the surface of the second film layer side is less than 20°, then the thermosensitive adhesive may penetrate too much into the inside of the second film layer with spreading on the surface of the second film layer in coating with the thermosensitive adhesive. Accordingly, too much time may be taken in heating the thermosensitive adhesive layer surface to make it exhibit the tacky force thereof, therefore causing a problem of production efficiency reduction owing to speed reduction in label sticking to objects, and a problem of label deformation by heat. When the contact angle is more than 80°, then the thermosensitive adhesive could not spread on the surface of the second film layer and could hardly penetrate into the inside of the second film layer, and therefore too much time may be taken for drying in coating with the thermosensitive adhesive, therefore causing a problem of reduction in thermosensitive adhesive label production efficiency and a problem of poor anti-blocking property of the labels to be on an impracticable level.

For controlling the contact angle with water of the surface of the second film layer side, employable is a method of controlling the amount of the inorganic fine powder surface-treated with a surface-treating agent to be added to the second film or regulating the temperature in stretching.

When the surface strength of the thermosensitive adhesive layer is less than 0.6 kg-cm, then a part of the label may remain on the object in peeling the label after use of containers. On the other hand, when the surface strength is more than 1.8 kg-cm, then the peeling strength between the object and the label may be too high and it may be difficult to separate the object and the label.

For controlling the surface strength of the thermosensitive adhesive layer, there may be employed a method of controlling the amount of the inorganic fine powder surface-treated with a surface-treating agent to be added to the second film or regulating the temperature in stretching thereby to control the aperture ratio of the second film layer and to regulate the penetration of the thermosensitive adhesive into the second film layer.

In case where the liquid absorption volume of the second film layer is at least 1.0 ml/m$^2$, the thermosensitive adhesive may readily penetrate into the inside of the second film layer in coating the layer with it, and therefore the coating speed may be increased and the producibility may be thereby enhanced. In addition, the thermosensitive adhesive may be applied onto the layer thinly and uniformly, and the coating process may be readily industrialized. Accordingly, a large amount of the thermosensitive adhesive does not remain on the surface of the second film layer and blocking can be prevented. When the liquid absorption volume is at most 5.5 ml/m$^2$, then the thermosensitive adhesive may be prevented from too much penetrating into the inside of the second film layer and a problem of poor expression of adhesiveness of the coated layer may be readily evaded. Even when the thermosensitive adhesive may penetrate into the inside of the second film layer, the adhesion strength may be secured so far as the thermosensitive adhesive is applied thickly. In such a case, however, the drying speed may be limited in coating, or the coated layer may be troubled by blocking or the handlability thereof may worsen. Therefore, such thick coating is unfavorable as increasing the production cost of thermosensitive labels.

For controlling the liquid absorption volume of the second film layer, there may be employed a method of controlling the amount of the inorganic fine powder surface-treated with a surface-treating agent to be added to the second film layer or regulating the temperature in stretching to thereby control the aperture ratio of the layer, or further regulating the thickness of the second film layer.

(First Film Layer)

The first film layer constituting the thermosensitive adhesive label of the invention preferably contains a thermoplastic resin.

The type of the thermoplastic resin to be used in the first film layer is not specifically defined. The thermoplastic resin includes ethylenic resins such as high-density polyethylene, middle-density polyethylene, low-density polyethylene, etc.; polyolefinic resins such as propylenic resins, polymethyl-1-pentene, ethylene-cyclic olefin copolymers, etc.; polyamide resins such as nylon-6, nylon-6,6, nylon-6,10, nylon-6,12, etc.; thermoplastic polyester resins such as polyethylene terephthalate and its copolymers, polyethylene naphthalate, aliphatic polyesters, etc.; other thermoplastic resins such as polycarbonate, atactic polystyrene, syndiotactic polystyrene, polyphenylene sulfide, etc. Two or more of these may be combined for use herein. Of those, preferred are polyolefinic resins from the viewpoint of the chemical resistance and the production cost thereof; and more preferred are propylenic resins.

As the propylenic resins, usable are propylene homopolymer, and copolymers of the main ingredient of propylene and an α-olefin such as ethylene, 1-butene, 1-hexene, 1-heptene, 4-methyl-1-pentene or the like. The stereospecificity of the propylenic resin is not specifically defined, and the resin may be an isotactic or syndiotactic one or may have any degree of stereospecificity. In case where the propylenic resin is a copolymer, it may be a binary, ternary or quaternary polymer, or may be a random copolymer or a block copolymer. Of those, preferred are polyolefinic resins having a melting point (DSC peak temperature) of lower than 160° C.; and concretely more preferred are polynary random copolymers comprising propylene as the main ingredient.

The amount of the thermoplastic resin in the first film layer is preferably from 40 to 100% by weight, more preferably from 45 to 95% by weight, even more preferably from 50 to 90% by weight.

If desired, an inorganic fine powder, an organic filler, a stabilizer, a light stabilizer, a dispersant, a lubricant, an antistatic agent or the like may be added to the first film layer. As the additives, preferred are an inorganic fine powder and an organic filler; and more preferred is an inorganic fine powder. If added to the layer, the amount of the inorganic fine powder or the organic filler thereto is preferably from 0 to 60% by weight, more preferably from 5 to 55% by weight, even more preferably from 10 to 50% by weight.

In case where an inorganic fine powder is added, its particle size may be generally from 0.01 to 15 preferably from 0.1 to 5 μm. Concretely, as the powder, usable are calcium carbonate, baked clay, silica, diatomaceous earth, white clay, talc, titanium oxide, barium sulfate, alumina, zeolite, mica, sericite, bentonite, sepiolite, vermiculite, dolomite, wollastonite, glass fibers, etc. In case where the inorganic fine powder is added, it is desirable that the surface of the inorganic fine powder is previously surface-treated for hydrophilication and/or oleophilication. The surface treatment enhances the dispersibility of the powder, and various properties such as printability, coatability, rubbing resistance, labelability and secondary workability can be imparted to the first film layer.

In case where an organic filler is added, the mean dispersion particle diameter thereof may be generally from 0.01 to 15 μm, preferably from 0.1 to 5.0 μm. In case where an organic filler is added, the filler is preferably formed of a resin differing from the thermoplastic resin of the main ingredient of the layer. For example, when the thermoplastic resin film is a polyolefinic resin film, then the organic filler to be added thereto may be a polymer such as polyethylene terephthalate, polybutylene terephthalate, polycarbonate, nylon-6, nylon-6,6, cyclic polyolefin, polystyrene, polymethacrylate or the like, which has a melting point (for example, 170 to 300° C.) or a glass transition temperature (for example, 170 to 280° C.) higher than the melting point of the polyolefinic resin and which is immiscible with the polyolefinic resin.

The first film layer may be stretched in the monoaxial or biaxial direction thereof. The first film layer may have a multilayer structure. In case where the layer has a multilayer structure, the constitutive layers thereof may be stretched to the same draw ratio, or may be stretched differently, or a unstretched film may be stuck to a stretched first film layer.

Preferably, the thickness of the first film layer is from 25 to 125 µm, more preferably from 35 to 95 µm, even more preferably from 45 to 75 µm. In case where the first film layer has a multilayer structure, the total thickness thereof is preferably within the above range.

(Second Film Layer)

The second film layer constituting the thermosensitive adhesive label of the invention preferably contains a thermoplastic resin.

Figure 2:
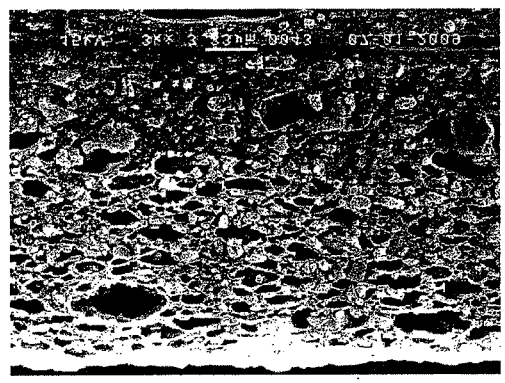
FIG. 2 is electron microscopic pictures of cross section of an embodiment of the thermosensitive adhesive label.
Figure 2:
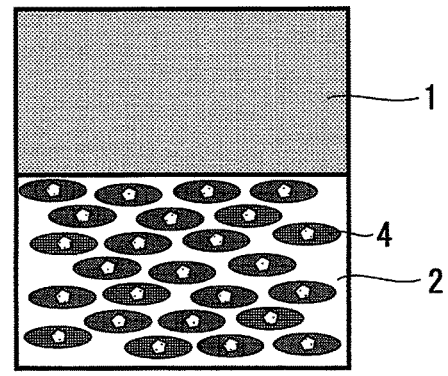
Figure 2:
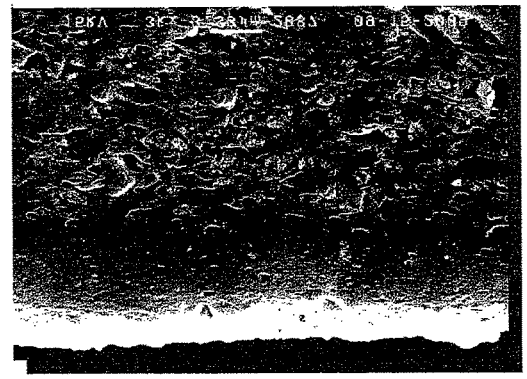
Figure 2:
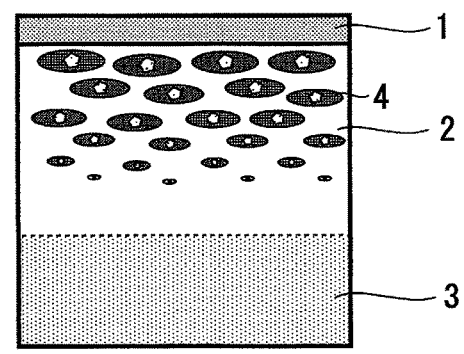

The second film layer in the invention is a porous film. In the process of forming a thermosensitive adhesive layer described in detail below on the second film layer, a part of the thermosensitive adhesive is absorbed into the inside of the second film layer and the thermosensitive adhesive in such state is dried and solidified to form the thermosensitive adhesive layer on the surface of the second film layer (FIG. 2).

The amount of the thermosensitive adhesive used to impart labelability (i.e. amount per square meter, coating amount) depends on the type of the thermosensitive adhesive. General preferable range of the amount can be determined to some extent. When the thermosensitive adhesive is applied on the laminate film in an amount sufficient to impart labelability, a part of the adhesive is stored inside of the second film layer and an excessive amount of the thermosensitive adhesive does not remain on the surface of the second film layer whereby anti-blocking property of the thermosensitive adhesive label and the surface strength of the thermosensitive adhesive layer are improved. In case where an excessive amount of the thermosensitive adhesive is absorbed into the inside of the second film layer, labelability may worsen. It is therefore preferable to appropriately determine a composition for the second film layer and a stretching condition to adjust the porosity and thickness of the layer so that the liquid absorption volume can be controlled to be in an appropriate range and a part of the thermosensitive adhesive can be absorbed into the inside of the second film layer.

The thermoplastic resins for use in the second film layer are not specifically defined, for which the same ones as those for the first film layer may be used. The amount of the thermoplastic resin to be in the second film layer is preferably from 28 to 57% by weight, more preferably from 30 to 55% by weight, even more preferably from 40 to 50% by weight.

If desired, the same inorganic fine powder, organic filler, stabilizer, light stabilizer, dispersant, lubricant, antistatic agent and the like as in the first film layer may be added to the second film layer. In particular, an inorganic fine powder surface-treated with at least one surface-treating agent is preferably added to the second film layer. The surface-treating agent is preferably at least one of a water-soluble cationic copolymer and a water-soluble anionic surfactant.

The water-soluble cationic copolymer for use for the surface-treating agent is preferably a copolymer of (1) at least one of a diallylamine salt or an alkyldiallylamine salt and (2) a nonionic hydrophilic vinyl monomer.

The anion to form the diallylamine salt or the alkyldiallylamine salt (1) is preferably selected from chloride ion, bromide ion, sulfate ion, nitrate ion, methylsulfate ion, ethylsulfate ion, and methanesulfonate ion. Specific examples of the diallylamine salt or the alkyldiallylamine salt (1) include diallylamine salts, alkyldiallylamine salts and dialkyldiallylamine salts in which the alkyl group has from 1 to 4 carbon atoms, or that is, methyldiallylamine salts, ethyldiallylamine salts, dimethyldiallylamine salts, and methacryloyloxyethyltrimethylammonium, acryloyloxyethyltrimethylammonium, methacryloyloxyethyldimethylethylammonium or acryloyloxyethyldimethylethylammonium chloride, bromide, methosulfate or ethosulfate, and quaternary ammonium salts to be produced through alkylation of N,N-dimethylaminoethyl methacrylate or N,N-dimethylaminoethyl acrylate with an epoxy compound such as epichlorohydrin, glycidol, glycidyltrimethylammonium chloride or the like. Of those, preferred are diallylamine salts, methyldiallylamine salts and dimethyldiallylamine salts.

Specific examples of the nonionic hydrophilic vinyl monomer (2) include acrylamide, methacrylamide, N-vinylformamide, N-vinylacetamide, N-vinylpyrrolidone, 2-hydroxyethyl (meth)acrylate, 2-hydroxy (meth)acrylate, 3-hydroxypropyl (meth)acrylate, methyl (meth)acrylate, ethyl (meth)acrylate, and butyl (meth)acrylate. Of those, preferred are acrylamide and methacrylamide.

The copolymerization ratio of (1) and (2) may be any desired one. Preferably, (1) is from 10 to 99 mol %, more preferably from 50 to 97 mol %, even more preferably from 65 to 95 mol %; and (2) is preferably from 1 to 90 mol %, more preferably from 3 to 50 mol %, even more preferably from 3 to 35 mol %.

On the other hand, the water-soluble anionic surfactant for use as the surface-treating agent has an anionic functional group in the molecule. Specific examples of the water-soluble anionic surfactant includes sulfonic acid salts with a hydrocarbon group having from 4 to 40 carbon atoms, phosphate ester salts with a hydrocarbon group having from 4 to 40 carbon atoms, monophosphate or diphosphate salts of higher alcohols having from 4 to 40 carbon atoms, alkylbetaines and alkylsulfobetaines with a hydrocarbon group having from 4 to 40 carbon atoms, etc. These are suitably selected so as to attain the effect of the invention.

The amount of the inorganic fine powder or the organic filler, if any, in the second film layer is preferably from 43 to 72% by weight, more preferably from 45 to 70% by weight, even more preferably from 50 to 60% by weight.

Preferably, the thickness of the second film layer is from 0.5 to 10 µm, more preferably from 1 to 7 µm, even more preferably from 3 to 5 µm. The ratio of the thickness of the first film layer to the thickness of the second film layer is not specifically defined. When the thickness of the first film layer is 75 µm, then the thickness of the second film layer may be generally from 1 to 10 µl, preferably from 3 to 7 µm, more preferably from 3 to 5 µm.

The surface aperture ratio of the second film layer is preferably from 10 to 55%, more preferably from 11 to 50%, even more preferably from 13 to 50%, still more preferably from 15 to 48%, further more preferably from 20 to 40%. When the surface aperture ratio is at least 10%, then it is favorable as readily preventing blocking; and when at most 55%, then it is also favorable as readily keeping the surface strength. The surface aperture ratio of the second film layer may be controlled to fall within the desired range, for example, by controlling the amount of the inorganic fine powder surface-treated with a surface-treating agent to be added to the second film layer and by regulating the temperature in stretching. The surface aperture ratio as referred to in the invention means the value to be measured according to the method described in the section of Examples given hereinunder.

The porosity of the second film layer is preferably from 21 to 54%, more preferably from 23 to 50%, even more preferably from 25 to 45%, still more preferably from 30 to 40%. When the porosity is at least 21%, it is favorable since a thermosensitive adhesive may readily penetrate into the layer to prevent blocking; and when at most 54%, then it is also favorable since a thermosensitive adhesive can be applied to the layer thinly and uniformly. The porosity of the second film layer may be controlled to fall within the desired range, for example, by controlling the amount of the inorganic fine powder to be in the second film layer, or by controlling the draw ratio in stretching of the second film layer, or by regulating the temperature in stretching. The porosity as referred to in the invention means the value expressed by the formula (1) mentioned below. In formula (1), $\rho_0$ means the true density of the second film layer, and $\rho$ means the density of the second film layer. The true density is equal to the density of the composition of the second film layer so far as the composition of the second film layer before stretched does not contain a large quantity of air. Concretely, the porosity may be determined according to the method described in the section of Examples to be given hereinunder.

$$\text{Porosity (\%)}=[(\rho_0-\rho)/\rho_0]\times 100 \quad (1)$$

(Stretching)

Preferably, the first film layer and the second film layer constituting the thermosensitive adhesive label of the invention are stretched. After the first film layer and the second film layer are laminated, they may be stretched in the monoaxial or biaxial direction to give a laminate in which all the constitutive layers are oriented in the monoaxial or biaxial direction. The first film layer is previously stretched in the monoaxial direction, then the second film layer is laminated on one surface of the thus-stretched first film layer, and this may be again monoaxially stretched in the direction differing from the stretching direction of the first film layer, thereby giving a laminate oriented in the biaxial/monoaxial direction. The constitutive layers may be separately stretched and may be laminated. Employing these methods or methods similar thereto, a multilayer-structured laminate having a desired stretching state may be obtained. For example, apart from the above, unstretched/monoaxial, monoaxial/monoaxial, biaxial/monoaxial, unstretched/biaxial, monoaxial/biaxial or biaxial/biaxial laminates may be produced. In case where the first film layer in the thermosensitive adhesive label comprises two types of layers as described below, for example, unstretched/monoaxial/monoaxial, monoaxial/monoaxial/monoaxial, unstretched/biaxial/monoaxial, monoaxial/biaxial/monoaxial, biaxial/biaxial/monoaxial, unstretched/biaxial/biaxial, monoaxial/biaxial/biaxial, biaxial/biaxial/biaxial laminates may be produced.

Various known methods may be employed for stretching. Preferably, the stretching is attained at a temperature lower by at least 5° C. than the melting point of the resin constituting the layer; and in case where two or more resins are used, the stretching may be attained preferably at a temperature lower by at least 5° C. than the melting point of the resin of which the amount is the largest of all the constitutive resins. For example, in case where a propylene homopolymer having a melting point of from 155 to 167° C. is used, the stretching temperature is preferably selected within a range of from 100 to 162° C.; and in case where a high-density polyethylene having a melting point of from 121 to 136° C. is used, the stretching temperature is preferably selected within a range of from 70 to 131° C.

Concretely, the stretching method includes a method of stretching a film between rolls where the rolls rotate at a different peripheral speed, and a clip stretching method where a tenter oven is used. According to the stretching method between rolls, the draw ratio in stretching may be regulated in any desired manner, thereby readily producing thermoplastic resin films having any desired rigidity, opacity, smoothness and glossiness. The stretching speed is not specifically defined, but in general, it is preferably from 20 to 350 m/min.

Not specifically defined, the draw ratio in stretching may be determined in consideration of the object for use of the thermosensitive adhesive label of the invention and the characteristics of the thermoplastic resin used. In the roll stretching method, in general, the draw ratio is preferably from 2 to 11 times, more preferably from 3 to 10 times, even more preferably from 4 to 7 times. In the clip stretching method of using a tenter oven, the draw ratio is preferably from 4 to 11 times. The areal draw ration in combination of those methods may be generally from 2 to 80 times, preferably from 3 to 60 times, more preferably from 4 to 50 times. When the areal draw ratio is at least 2 times, the stretching unevenness may be prevented and the stretched film may readily have a more uniform thickness; and when at most 80 times, the film being stretched may be more effectively prevented from being cut or from having any large hole to form therein.

(Heat Treatment)

After stretched, the film is preferably heat-treated. The temperature in heat treatment is preferably selected within a range higher by from 0 to 30° C. than the stretching temperature. The heat treatment reduces the thermal shrinkage of the film in the stretching direction, and therefore, the film may be free from a trouble of roll tightening in storage of film roll products, and may be free from a trouble of waving owing to thermal shrinkage thereof. For the heat treatment, the film may be treated with a hot roll or in a hot oven; and if desired, these may be combined. Preferably, the heat treatment is attained while the stretched film is kept under tension, thereby yielding a higher treatment effect.

In the invention, a three-layer structure film of a first film layer [b], a first film layer [a] and a second film layer is better than a two-layer structure film of a first film layer and a second film layer, as bringing about the advantage of decorative modification for surface glossiness regulation to thereby enhance the commercial value of the products.

(Thermosensitive Adhesive Layer)

In the thermosensitive adhesive label of the invention, a thermosensitive adhesive layer is formed on the surface of the second film layer side of the film laminate.

The thermosensitive adhesive for use in the invention preferably comprises a thermoplastic resin, a tackifier and a solid plasticizer. The thermoplastic resin includes polyvinyl acetate, poly-n-butyl methacrylate, vinyl chloride-vinylidene chloride copolymer, vinyl acetate-2-ethylhexyl acrylate copolymer, ethylene-vinyl acetate copolymer, vinylpyrrolidone-styrene copolymer, styrene-butadiene rubber, butyl rubber, vinylpyrrolidone-ethyl acrylate copolymer and the like having a glass transition point of not higher than 20° C. The tackifier is an ingredient for enhancing the tackiness of the adhesive when activated by heating; and this is not tacky at room temperature (10 to 30° C.) but is activated by heating (80 to 130° C.) and still remains tacky for a while (5 seconds to 2 weeks) even after the heating is stopped. The tackifier includes rosin derivatives (rosin, polymerized rosin, hydrogenated rosin, and their esters with glycerin, pentaerythritol or the like, resin acid dimer, etc.), terpene resins, petroleum resins, phenolic resins, xylene resins, etc. The solid plasticizer is solid at room temperature, and melts when heated at a temperature not lower than the melting point thereof, thereby swelling or dissolving the thermoplastic resin and the tackifier to express tackiness/adhesiveness. Once melted, the plasticizer hardly crystallizes, therefore prolonging the adhesiveness retention time after thermal activation of the adhesive. The solid plasticizer includes diphenyl phthalate, dihexyl phthalate, dicyclohexyl phthalate, dihydroabiethyl phthalate, dimethyl isophthalate, sucrose benzoate, ethylene glycol dibenzoate, trimethylolethane tribenzoate, tribenzoyl glyceride, pentaerythritol tetrabenzoate, sucrose octaacetate, tricyclohexyl citrate, N-cyclohexyl-p-toluenesulfonamide, etc. If desired, an antioxidant, colloidal silica, alumina sol and the like may be added to the thermosensitive adhesive.

The thermosensitive adhesive layer is preferably activated at a temperature of from 70 to 150° C., more preferably from 80 to 130° C. The activation temperature means a peak temperature in the differential scanning calorimetry of the thermosensitive adhesive. Most components in the thermosensitive adhesive layer are activated by heating at a temperature within the above range, the thermosensitive adhesive label of the invention can develop labelability easily.

In the differential scanning calorimetry of the thermosensitive adhesive, an absorption is observed even at a temperature below the above range, for example at 50° C. Therefore, a part of the thermosensitive adhesive is melt and activated even at the temperature. In the thermosensitive adhesive labels under prior art, a thermosensitive adhesive layer is only placed on a label substrate and therefore blocking is caused when only a part of the thermosensitive adhesive layer in the label is activated. The thermosensitive adhesive labels under prior art is deteriorated during storage in summer. The thermosensitive adhesive label of the invention is characterized by improving anti-blocking property during storage in summer since a part of the thermosensitive adhesive is absorbed into the inside the second film layer to thereby reduce the amount of diffusive thermosensitive adhesive.

When the thermosensitive adhesive label of the invention is heated to the activation temperature of the thermosensitive adhesive layer and pressed, the molten thermosensitive adhesive is forced to go out from the porous second film layer toward the outside surface whereby the labelability is maintained.

Coating with the thermosensitive adhesive may be attained by the use of a roll coater, a blade coater, a bar coater, an air knife coater, a gravure coater, a reverse coater, a die coater, a lip coater, a spray coater, a blade coater, a comma coater or a size press, or by dipping. The coating amount is preferably from 0.5 to 10 $g/m^2$ as the solid content, more preferably from 1 to 5 $g/m^2$. The thickness of the dried thermosensitive adhesive layer is preferably from 0.5 to 10 μm, more preferably from 1 to 8 μm, even more preferably from 1 to 5 μm.

(Printing)

The surface of the first film layer of the thermosensitive label of the invention may be printed. For example, the trade name, the constitutive ingredients, the price, the manufacturer, the design and the like of the product may be printed thereon according to a printing method of gravure printing, screen printing, offset printing, flexographic printing or the like. Roll printing such as gravure printing, flexographic printing or the like is especially suitable to the surface of the first film layer of the invention. In general, after the thermosensitive adhesive layer is formed on the second film layer, the printing is effected; however, before the thermosensitive adhesive layer is formed on the second film layer, the printing may be effected.

(Anti-Blocking Property)

The thermosensitive adhesive label of the invention has an excellent anti-blocking property. The anti-blocking property can be evaluated by measuring the shear strength of the label. In the invention, the shear strength is the value measured according to the method described in the section of Examples given hereinunder. The shear strength (gf) of the laminate in the invention is preferably from 0 to 200 gf/15 mm, more preferably from 0 to 180 gf/15 mm, even more preferably from 0 to 120 gf/15 mm. When the shear strength is at most 200 gf/15 mm, then the blocking hardly occurs with little trouble to labeling.

[Labeled Container]

(Characteristics)

The labeled container of the invention is a container to which the label of the invention has been stuck. The labeled container of the invention is easy to produce since the labeler applicability of the label is excellent, and is characterized in that the label is stuck to the container with a sufficient strength, and when delabeled after use, the peeled label leaves little paste on the surface of the container.

(Container)

The material of the container to which the label of the invention is stuck is generally a thermoplastic resin, including, for example, polyethylene terephthalate (PET) and its copolymers, and polyolefin resins such as polypropylene (PP), polyethylene (PE) such as high-densitypolyethylene, etc. The material of the container may be steel, aluminum, glass or ceramics. The cross section of the body of the container may not be always true circular but may be oval or rectangular. In case where the cross section is rectangular, the angle thereof preferably has a curvature. From the viewpoint of the strength, the cross section of the body is preferably true circular or oval nearly to true circular, and is most preferably true circular.

(Container Labeling Method)

The labeled container of the invention is produced by labeling a container with the thermosensitive adhesive label of the invention. The thermosensitive adhesive label may be stuck to the entire surface of a container, or may be partly thereto. The thermosensitive adhesive label may be stuck to a container in any known conventional method. For labeling, in general, a labeler is employed, for example, according to a method comprising putting the surface of the adhesive layer side of the thermosensitive adhesive label on the surface of a container, and pressing it with a hot plate from the label substrate side, or a method comprising heating the thermosensitive layer by a heat source such as hot drum, infrared generator or the like to thereby activate the thermosensitive adhesive layer, and then sticking the label to a container. For the labeler, for example, referred to are those described in JP-A 8-58755, 11-321831, 2000-25725. The heating temperature may be suitably selected within a range of the activation temperature of the thermosensitive adhesive layer, and is, for example, preferably from 70 to 150° C., more preferably from 80 to 130° C.

(Labelability)

The thermosensitive adhesive label of the invention is excellent in labelability. The labelability can be evaluated by measuring the peeling strength. In the invention, the peeling strength is the value measured according to the method described in the section of Examples given hereinunder. The peeling strength (gf) to polyethylene terephthalate of the thermosensitive adhesive label of the invention is preferably from 200 to 500 gf/15 mm, more preferably from 250 to 500 gf/15 mm, even more preferably from 300 to 450 gf/15 mm. When the peeling strength is at least 200 gf/15 mm, the label is not moved or peeled after stuck to a container. When at most 500 gf/15 mm, there hardly occurs a problem of difficult delabeling in separation of the label from the container.

(Application Mode)

The labeled container of the invention may be surrounded by the label around the body thereof, or the label may be stuck partly to the body. The containers may be filled with various contents. For the contents, for example, there may be mentioned shampoo, rinse, liquid cosmetics, detergents, wax, bactericides, antiseptics, brightening agents, mechanical oils, engine oils, wines, beers, sake (rice wine), alembic, mineral water, edible oil, seasonings, refreshing drinks, etc. The empty container from which all the contents were taken out is delabeled from the edge of the label, not leaving the label on the surface of the container, and the label and the container can be thereby separated. This manner is economical since the cost in collecting the wastes and recycling them can be reduced.

EXAMPLES

The characteristics of the invention are described more concretely with reference to Examples and Comparative Examples given below. In the following Examples, the material used, its amount and the ratio, the details of the treatment and the treatment process may be suitably modified or changed not overstepping the sprit and the scope of the invention. Accordingly, the invention should not be limitatively interpreted by the Examples mentioned below.

Here, a thermoplastic resin film composed of a first film layer and a second film layer was produced according to the process mentioned below, then a thermosensitive adhesive layer was formed on the surface of the second film layer to produce a thermosensitive adhesive label, and a labeled container was produced according to a thermal labeling method using the label, and evaluated. The details of the materials used are given in Table 1. In the table, "MFR" means a melt flow rate. The thermosensitive adhesives used are shown in Table 2. The materials used in producing thermoplastic resin films and their blend ratio (% by weight), and the stretching condition and the physical data of the obtained thermoplastic resin films are shown in Table 3. The thermoplastic resin film and the thermosensitive adhesive used in producing labeled containers, and the test results of the produced labeled containers are shown in Table 4. The numbers of production examples in Table 4 correspond to the numbers of production examples in Table 3.

TABLE 1

| Material | Details |
| --- | --- |
| (1) Propylene Homopolymer | Propylene homopolymer having MFR of 5 g/10 min (230° C., 2.16 kg load) and a melting point of 164° C. (DSC peak temperature) (by Nippon Polypro): trade name, [NOVATEC PP FY4] |
| (2) Heavy Calcium Carbonate | Calcium carbonate dry-ground to have a mean particle size of 1.25 μm measured according to an air penetration method (by Bihoku Hunka Kogyo): trade name [SOFTON 1800] |

TABLE 1-continued

| Material | Details |
| --- | --- |
| (3) Surface-Treated Calcium Carbonate | Surface-treated calcium carbonate wet-ground to have a mean particle size of 1 μm measured according to a microtrack method (by Fimatec): trade name, [AFF-Z] |
| (4) Colloidal Calcium Carbonate | Synthetic colloidal calcium carbonate having a mean particle size of 0.1 μm measured according to an air penetration method (by Maruo Calcium): trade name [CALFINE YM15] |

TABLE 2

| No. | Trade Name | Ingredient |
| --- | --- | --- |
| a | ECOBRID ECO5635 | EVA adhesive having a viscosity of 80 mPa · s (23° C.) (by Daicel FineChem) |
| b | HEAT MAGIC 2010 | EVA adhesive having a viscosity of 150 mPa · s (25° C.) (by Toyo Ink Mfg) |
| c | DIC SEAL ED900N | EVA adhesive having a viscosity of 1350 mPa · s (25° C.) (by DIC Graphics) |

[Production of Thermoplastic Resin Film]

Production Example 1

The composition of the first film layer [a] and the composition of the second film layer shown in Table 3 were separately melted and kneaded in two extruders set at 250° C., and the compositions were laminated in a die and extruded out, then cooled with a cooling device to 70° C. to produce a two-layer unstretched film.

The film was heated, and roll-stretched in the machine direction at the stretching temperature (1) shown in Table 3 to the draw ratio also shown in Table 3. Next, this was heat-treated with a roll set at a temperature higher by 20° C. than the stretching temperature (1), and then cooled to give a stretched film. Next, the resulting stretched film was corona-treated on both surfaces thereof at 40 W/m²·min using a discharger (by Kasuga Electric), thereby giving a monoaxially-stretched/monoaxially-stretched thermoplastic resin film having the thickness shown in Table 3.

Production Examples 2 to 4, 7 to 9

The composition of the first film layer [a] shown in Table 3 was melted and kneaded in an extruder set at 250° C., then extruded out and cooled to 70° C. with a cooling device to produce a single-layer unstretched film. The unstretched film was heated at the stretching temperature (1) shown in Table 3, then stretched by 5 times between rolls in the machine direction to give a machine-direction monoaxially-stretched film.

Next, the composition of the second film layer shown in Table 3 was melted and kneaded in an extruder set at 250° C., then laminated on one surface of the above-mentioned, machine-direction monoaxially-stretched film, heated at the stretching temperature (2) shown in Table 3, and stretched by times in the cross direction with a tenter stretcher, heat-treated at a temperature higher by 20° C. than the stretching temperature (2), and the resulting film was corona-treated at 40 W/m²·min on both surfaces thereof using a discharger (by Kasuga Electric), thereby producing a biaxially-stretched/monoaxially-stretched thermoplastic resin film having the thickness shown in Table 3.

Production Example 5

The composition of the first film layer [a] and the composition of the second film layer shown in Table 3 were separately melted and kneaded in two extruders set at 250° C., and the compositions were laminated in a die and extruded out, then cooled with a cooling device to 70° C. to produce a two-layer unstretched film.

The film was heated, and roll-stretched by 6 times in the machine direction. The stretching temperature is as shown in Table 3. Next, the resulting stretched film was heated at the stretching temperature (2) shown in Table 3, then stretched by 6 times in the cross direction with a tenter stretcher, heat-treated at a temperature higher by 20° C. than the stretching temperature (2), and the resulting film was corona-treated on both surfaces thereof at 40 W/m²·min using a discharger (by Kasuga Electric), thereby giving a biaxially-stretched/biaxially-stretched thermoplastic resin film having the thickness shown in Table 3.

Production Examples 6, 10

The composition of the first film layer [a] shown in Table 3 was melted and kneaded in an extruder set at 250° C., then extruded out and cooled to 70° C. with a cooling device to produce a single-layer unstretched film. The unstretched film was heated at the stretching temperature (1) shown in Table 3, then stretched by 5 times between rolls in the machine direction to give a machine-direction monoaxially-stretched film.

Next, the composition of the first film layer [b] and the composition of the second film layer shown in Table 3 were separately melted and kneaded in two extruders set at 250° C., and laminated on both surfaces of the above-mentioned, machine-direction monoaxially-stretched film, then heated at the stretching temperature (2) shown in Table 3, stretched by 8 times in the cross direction using a tenter stretcher, heat-treated at a temperature higher by 20° C. than the stretching temperature (2), and the resulting film was corona-treated at 40 W/m²·min on both surfaces thereof using a discharger (by Kasuga Electric), thereby producing a monoaxially-stretched/biaxially-stretched/monoaxially-stretched thermoplastic resin film having the thickness shown in Table 3.

Production Example 11

Based on the description in JP-A 7-319390, the thermoplastic resin film used in Example 1 in the patent publication was produced.

[Production of Thermosensitive Adhesive Label Through Formation of Thermosensitive Adhesive Layer]

Examples 1 to 8 and Comparative Examples 1 to 5

The thermosensitive adhesive shown in Table 2 and chosen as shown in Table 4 was applied onto the second film layer of a thermoplastic resin film produced in the Production Example as in Table 3, using a gravure printer at a printing speed of 40 m/min, then led to pass through an oven at 45° C. and dried, taking 5 seconds to form a thermosensitive adhesive layer in 5 g/m² as a solid basis, thereby producing thermosensitive adhesive labels of Examples 1 to 8 and Comparative Examples 1 to 5. The thermoplastic resin film and the thermosensitive adhesive used for the thermosensitive adhesive labels are shown in Table 4. FIGS. 2(a) and (b) are electron microscopic pictures before and after forming the thermosensitive adhesive layer on the second film layer of the thermoplastic resin film of Production Example 5, respectively. These pictures show that a part of the thermosensitive adhesive is absorbed into the inside of the second film layer.

[Determination of Physical Properties of Thermosensitive Adhesive Labels]

Thus produced, the thermosensitive adhesive labels were analyzed for the physical properties as mentioned below. The results are shown in Table 3.

(1) Smoothness of Film Surface:

The Bekk smoothness of the surface and the back of the thermoplastic resin films produced in Production Examples was measured according to JIS-P8119.

(2) Surface Aperture Ratio:

The thermoplastic resin film produced in Production Examples was cut partly, the resulting film piece was stuck to a sample stage, then gold was vapor-deposited on the inspection surface (the surface of the second film layer) of the film piece, and the surface was photographed at 2000-fold magnification using a scanning microscope (Hitachi's S-2400). The open pores were traced onto a tracing film and filled up, and the resulting image was analyzed with an image analyzer (Nireco's Model Luzex IID) to determine the surface aperture ratio of the thermoplastic resin film (the image was analyzed at different 10 points, and the data were averaged to give the surface aperture ratio).

(3) Porosity:

The density of the second film layer of a thermoplastic resin film formed in Production Examples was determined under JIS-P8118, and according to the above-mentioned formula (1), the porosity of the film layer was computed. The true density $\rho_0$ of the second film layer in the formula (1) is the density of the composition used in forming the second film layer.

Figure 3:
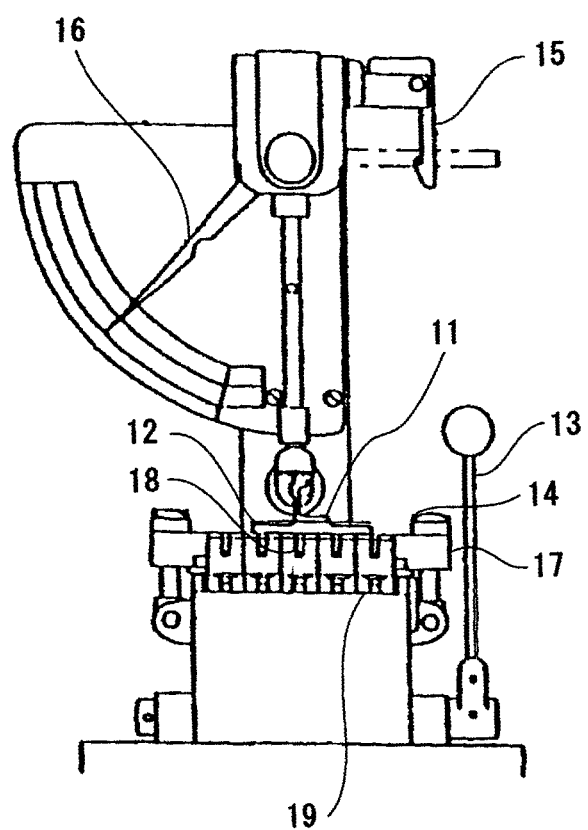
FIG. 3 is a cross-sectional view of Internal Bond Tester used in measurement of surface strength.
Figure 4:
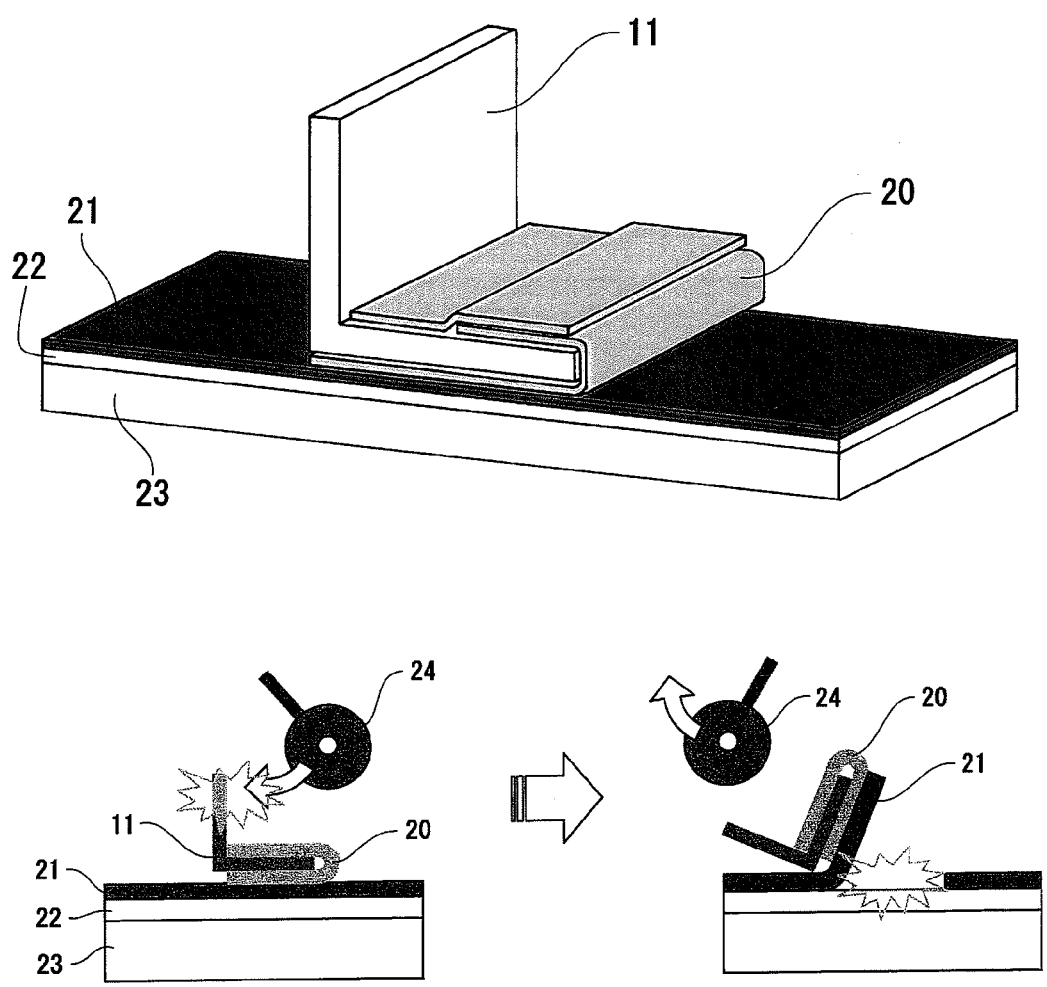
FIG. 4 is schematic drawings explaining measuring process of surface strength.

(4) Surface Strength:

Thus produced, the thermosensitive adhesive label was stored in an atmosphere at 23° C. and a relative humidity of 50% for 3 days, and then the adhesion strength of the label was measured with an adhesion tester (Kumagai Riki Kogyo's trade name, Internal Bond Tester) shown in FIG. 3. This is the surface strength of the thermosensitive adhesive layer of the tested label. In measuring the adhesion strength, cellophane tape (Nichiban's trade name: Cellotape LP-18) 20 was stuck to the surface of the thermosensitive adhesive layer 21 to prepare a sample for the test (FIG. 4). Via the Cellotape, an aluminium angle 11 was stuck to the upper face of the sample, and the lower face of the sample was set on a predetermined holder; and at an angle of 90 degrees, a pendular hammer 24 was banged down onto the aluminium angle 11 to impart shock thereto, and the surface strength of the thermosensitive adhesive layer was measured.

(5) Contact Angle:

A contact angle with water of the surface of the second film layer of a thermoplastic resin film formed in Production Examples was determined, using a contact angle gauge with ion-exchanged water (Kyowa Interface Science's Model CA-D).

(6) Liquid Absorption Volume:

The liquid absorption volume of the surface of the second film layer of a thermoplastic resin film formed in Production Examples was determined, according to "Japan TAPPI No. 51:2000" (Japan Technical Association of the Pulp and Paper Industry, Test Method for Pulp and Paper No. 51:2000, Bristow method). In the invention, the measured value within an absorption time of 2 seconds was taken as the liquid absorption volume.

TABLE 3

| | First Film Layer [b] | | First Film Layer [a] | | Second Film Layer | | Stretching | | | | | Layer Structure | | |
|---|---|---|---|---|---|---|---|---|---|---|---|---|---|---|
| | | Amount (% by | | Amount (% by | | Amount (% by | Stretching Temperature (° C.) | | Draw Ratio (times) | | Number of | | | Thickness |
| | Material | weight) | Material | weight) | Material | weight) | (1) | (2) | (1) | (2) | Layers | Number of Axis | | (μm) |
| Production Example 1 | | | 1 | 100 | 1 | 40 | 130 | | 6 | | 2 | 1st layer-a: monoaxial | | 75 |
| | | | | | 3 | 60 | | | | | | 2nd layer: monoaxial | | 5 |
| Production Example 2 | | | 1 | 50 | 1 | 55 | 140 | 155 | 5 | 8 | 2 | 1st layer-a: biaxial | | 75 |
| | | | 2 | 50 | 3 | 45 | | | | | | 2nd layer: monoaxial | | 5 |
| Production Example 3 | | | 1 | 50 | 1 | 40 | 140 | 155 | 5 | 8 | 2 | 1st layer-a: biaxial | | 75 |
| | | | 2 | 50 | 3 | 60 | | | | | | 2nd layer: monoaxial | | 5 |
| Production Example 4 | | | 1 | 50 | 1 | 30 | 140 | 155 | 5 | 8 | 2 | 1st layer-a: biaxial | | 75 |
| | | | 2 | 50 | 3 | 70 | | | | | | 2nd layer: monoaxial | | 5 |
| Production Example 5 | | | 1 | 100 | 1 | 45 | 140 | 155 | 6 | 6 | 2 | 1st layer-a: biaxial | | 75 |
| | | | | | 3 | 55 | | | | | | 2nd layer: biaxial | | 5 |
| Production Example 6 | 1 | 45 | 1 | 70 | 1 | 40 | 140 | 155 | 5 | 8 | 3 | 1st layer-b: monoaxial | | 3 |
| | | | | | | | | | | | | 1st layer-a: biaxial | | 72 |
| | 4 | 55 | 2 | 30 | 3 | 60 | | | | | | 2nd layer: monoaxial | | 5 |
| Production Example 7 | | | 1 | 50 | 1 | 60 | 140 | 155 | 5 | 8 | 2 | 1st layer-a: biaxial | | 75 |
| | | | 2 | 50 | 4 | 40 | | | | | | 2nd layer: monoaxial | | 5 |
| Production Example 8 | | | 1 | 50 | 1 | 25 | 140 | 155 | 5 | 8 | 2 | 1st layer-a: biaxial | | 75 |
| | | | 2 | 50 | 3 | 75 | | | | | | 2nd layer: monoaxial | | 5 |
| Production Example 9 | | | 1 | 70 | 1 | 40 | 140 | 155 | 5 | 8 | 2 | 1st layer-a: biaxial | | 75 |
| | | | 2 | 30 | 2 | 60 | | | | | | 2nd layer: monoaxial | | 5 |
| Production Example 10 | 1 | 55 | 1 | 70 | 1 | 40 | 140 | 155 | 5 | 8 | 3 | 1st layer-b: monoaxial | | 3 |
| | | | | | | | | | | | | 1st layer-a: biaxial | | 77 |
| | 4 | 45 | 2 | 30 | 3 | 60 | | | | | | 2nd layer: monoaxial | | 5 |
| Production Example 11 | | JP-A 7-319390, Example 1 | | | | | 140 | 160 | 5 | 7.5 | 3 | 1st layer-b: monoaxial | | 16 |
| | | | | | | | | | | | | 1st layer-a: biaxial | | 48 |
| | | | | | | | | | | | | 2nd layer: monoaxial | | 16 |

| | Physical Properties of Thermoplastic Resin Film | | | | | |
|---|---|---|---|---|---|---|
| | First Film Layer [a] or [b] | Second Film Layer | | | | |
| | Print Surface Smoothness (sec) | Surface Smoothness (sec) | Contact Angle (°) | Surface Aperture Ratio (%) | Porosity (%) | Liquid Absorption Volume (ml/m²) |
| Production Example 1 | 15000 | 4000 | 75 | 18 | 28 | 2.0 |
| Production Example 2 | 2100 | 1000 | 70 | 15 | 24 | 1.8 |
| Production Example 3 | 2100 | 6000 | 60 | 31 | 35 | 3.0 |
| Production Example 4 | 2100 | 13000 | 40 | 48 | 42 | 4.0 |
| Production Example 5 | 18000 | 18000 | 35 | 41 | 51 | 5.0 |
| Production Example 6 | 10000 | 6000 | 60 | 31 | 35 | 3.0 |
| Production Example 7 | 2100 | 700 | 85 | 10 | 20 | 0.5 |
| Production Example 8 | 2100 | 21000 | 15 | 51 | 55 | 6.0 |
| Production Example 9 | 1500 | 6000 | 110 | 31 | 35 | 0.0 |
| Production Example 10 | 500 | 6000 | 60 | 31 | 35 | 3.0 |
| Production Example 11 | 840 | 510 | 114 | 21 | 30 | 0.0 |

[Production of Labeled Container]

A pattern having 50% dot part was gravure-printed on the surface of the first film layer of the obtained thermosensitive adhesive label (800-mm wide roll). Next, the printed thermosensitive adhesive label was rewound with a slitter to a 80-mm wide roll, and the slit label was set in a heat labeler (Koyo Automatic Machine's Heat Labeler, trade name: LRH-101-K), and stuck to a 500-ml PET cylindrical container, thereby producing a label-surrounded (80-mm wide, 222-mm long in the circumferential direction) container. The labeling condition was as follows: The heat drum temperature was 75 to 80° C., the temperature of the heating IR heater on the thermosensitive adhesive layer side was 110° C., and the labeling speed was 110 bottles per minute.

[Evaluation in Practical Use of Thermosensitive Adhesive Label]

Thus produced, the labeled containers were tested and evaluated as follows. The results are shown in Table 4.

(1) Gravure Printing Dot Reproducibility:

The 50% dot part of the gravure-printed surface was analyzed with an image analyzer connected to a stereomicroscope (Nireco's trade name: Model Luzex IID), and from the actual dot area ratio, the dot gain was computed, and the image was evaluated based on the criteria mentioned below. In general, when the roughness of the surface is larger, especially when the volume of the surface dot projections is larger, the ink in the dot area flows away more therearound and the dot gain increases more, and therefore the printed images tend to be smudgy and blurred.

◉: Dot gain is within a range of from 5% to less than 15%.
○: Dot gain is within a range of from 15% to less than 25%.
Δ: Dot gain is within a range of from 25% to less than 30%.
X: Dot gain is 30% or more.

(2) Coatability with Thermosensitive Adhesive:

In the process of forming the thermosensitive adhesive label, the conditions were changed to the following to evaluate the coatability with the thermosensitive adhesive. Specifically, using a gravure-printing plate etched with a plover pattern having 7 cm width along the printing direction, the thermosensitive adhesive shown in Table 4 was applied at a printing speed of 40 m/min on the surface of the second film layer of the thermoplastic resin film shown in Table 4 to form a printing part in 5 g/m² as a solid basis, and then led to pass through an oven at 45° C. and dried therein, taking 5 seconds, to thereby form a thermosensitive adhesive layer. The coated pattern of the thermosensitive adhesive layer was checked by a loupe with 10 times magnification and reproducibility was evaluated according to the following 4 ranks.

◉: Good reproducibility of the plover pattern.
○: Reproduction of the plover pattern possible.
Δ: Coating possible, but reproduction of the plover pattern impossible.
X: Thermosensitive adhesive not remained on the coated surface.

(3) Anti-Blocking Property:

20 sheets of samples were prepared by cutting the thermosensitive adhesive label to the size of 80 mm length and 15 mm width, these were laid one upon another in such a manner that the surface of the first film layer of one sample was kept in contact with the surface of the thermosensitive adhesive layer of the adjacent sample to give stacked sheets. The stacked sheets were stored for 24 hours in an environment at a temperature of 50° C. and a relative humidity of 50% with a load of 500 g/cm² applied from the lowermost surface and the uppermost surface of the stacked sheets. Then, the set of the eighth sample and the ninth sample from the uppermost surface, the set of the tenth sample and the eleventh sample and the set of twelfth sample and thirteenth sample were picked out while the two samples forming each set were in contact. Each of the two samples of each set was fixed by chucks of a tensile tester (Orientec's RTM Model), and the adhesive strength at peeling (gf) was measured at a pulling speed of 50 mm/min according to JIS-6854-2. From the found data, the tested samples were evaluated according to the following 3 ranks.

◉: From 0 gf/15 mm to 10 gf/15 mm, not causing blocking.
○: From more than 10 gf/15 mm to 200 gf/15 mm, causing some blocking, but easy delabeling and no problem in use at printing and labeling.
X: More than 200 gf/15 mm, useless owing to severe blocking.

(4) Labelability:

The labeled container was broken down and the label part of the labeled container was cut into test pieces of 210 mm length and 15 mm width. Four such test pieces were cut out from one container. The label was partly peeled off from the edge of the test piece, and the peeled label edge and the container edge from which the label had been peeled off were fixed by the chucks of a tensile tester (Orientec's Model RTM) and pulled away at a speed of 200 mm/min according to JIS-6854-2, to thereby determine the adhesive strength at peeling (gf). The data were averaged, and the tested sample was evaluated according to the following six ranks.

X: More than 500 gf/15 mm.
The label does not peel just after labeling and during transportation and during use. The label can not be peeled off from the container by hand.
○: More than 450 gf/15 mm to 500 gf/15 mm.
The label does not peel just after labeling and during transportation and during use. After the label is peeled off from the container, a slight amount of the thermosensitive adhesive remains on the container.
◉: From 300 gf/15 mm to 450 gf/15 mm.
The label does not peel just after labeling and during transportation and during use. The label can be peeled off from the container after use by hand easily.
○: From 200 gf/15 mm to less than 300 gf/15 mm.
The label may partly peel just after labeling and during transportation and during use by users, but no problem in practical use.
Δ: From 10 gf/15 mm to less than 200 gf/15 mm.
The label may move or peel just after labeling and during transportation.
X: Less than 10 gf/15 mm.
The label peels just after labeling and during transportation.

(5) Surface Condition of Delabeled Container:

The labeled container was stored at a temperature of 25° C. and a relative humidity of 50% for 1 week after labeling, and the label was peeled off by hand, and the delabeled container was checked by eyes for the surface condition.

◉: No thermosensitive adhesive left on the container.
○: A slight amount of thermosensitive adhesive left on the container, but could be washed away with hot water at 40° C.
Δ: The second film layer and the thermosensitive adhesive left partly on the container.
X: The second film layer and the thermosensitive adhesive left on the entire surface of the container.

TABLE 4

| Thermo-sensitive Adhesive Label | Thermoplastic Resin Film | Thermo-sensitive Adhesive | Surface Strength of Thermo-sensitive adhesive layer (kg-cm) | Dot Reproduc-ibility | Coat-ability | Anti-Blocking Property Shear Strength (gf/15 mm) | Deci-sion | Labelability Peeling Strength (gf/15 mm) | Deci-sion | Surface Condition of Delabeled Bottle |
|---|---|---|---|---|---|---|---|---|---|---|
| Example 1 | Production Example 1 | b | 1.5 | ⊚ | ○ | 70 | ○ | 300 | ⊚ | ⊚ |
| Example 2 | Production Example 2 | b | 1.7 | ○ | ○ | 180 | ○ | 250 | ○ | ⊚ |
| Example 3 | Production Example 3 | b | 1.0 | ○ | ○ | 100 | ○ | 400 | ⊚ | ○ |
| Example 4 | Production Example 4 | b | 0.7 | ○ | ⊚ | 0 | ⊚ | 350 | ⊚ | ○ |
| Example 5 | Production Example 5 | b | 0.6 | ⊚ | ⊚ | 0 | ⊚ | 400 | ⊚ | ⊚ |
| Example 6 | Production Example 5 | a | 0.6 | ⊚ | ⊚ | 0 | ⊚ | 200 | ○ | ○ |
| Example 7 | Production Example 6 | b | 1.0 | ⊚ | ○ | 100 | ⊚ | 400 | ⊚ | ○ |
| Example 8 | Production Example 5 | c | 1.0 | ⊚ | ⊚ | 0 | ⊚ | 400 | ⊚ | ⊚ |
| Comparative Example 1 | Production Example 7 | b | 2.0 | ○ | △ | 600 | X | 300 | ○ | △ |
| Comparative Example 2 | Production Example 8 | a | 0.4 | ○ | X | 0 | ○ | 80 | △ | X |
| Comparative Example 3 | Production Example 9 | b | 1.0 | △ | △ | 950 | X | 410 | ⊚ | ○ |
| Comparative Example 4 | Production Example 10 | b | 1.0 | X | ○ | 950 | ○ | 400 | ⊚ | ○ |
| Comparative Example 5 | Production Example 11 | b | 1.5 | X | ○ | 430 | X | 400 | ⊚ | ○ |

As obvious from the results in Table 4, the thermosensitive adhesive label satisfying the condition in the invention may have a well-finished print and the coatability with adhesive is good. In addition, since the label is free from a trouble of blocking, it is easy to handle. Further, the label is excellent in the peeling strength after labeling, and the delabeled condition after use of labeled objects is good. Therefore, the label can be readily separated from the labeled object after use, or that is, the practicability of the label is good as facilitating sorted collection of labeled wastes.

While the present invention has been described in detail and with reference to specific embodiments thereof, it will be apparent to one skilled in the art that various changes and modifications can be made therein without departing from the spirit and scope thereof.

The present disclosure relates to the subject matter contained in Japanese Patent Application No. 294395/2009 filed on Dec. 25, 2009, and the subject matter contained in Japanese Patent Application No. 276644/2010 filed on Dec. 13, 2010, the contents of which are expressly incorporated herein by reference in their entirety. All the publications referred to in the present specification are also expressly incorporated herein by reference in their entirety.

The foregoing description of preferred embodiments of the invention has been presented for purposes of illustration and description, and is not intended to be exhaustive or to limit the invention to the precise form disclosed. The description was selected to best explain the principles of the invention and their practical application to enable others skilled in the art to best utilize the invention in various embodiments and various modifications as are suited to the particular use contemplated. It is intended that the scope of the invention not be limited by the specification, but be defined claims set forth below.

What is claimed is:

1. A thermosensitive adhesive label comprising:
a laminate film of a first film layer and a second film layer, and
a thermosensitive adhesive layer comprising a thermoplastic resin, a tackifier, and a solid plasticizer on the surface of the second film layer side of the laminate film, wherein:
the Bekk smoothness of the surface of the first film layer side of the laminate film is from 2000 to 20000 seconds,
the Bekk smoothness of the surface of the second film layer side of the laminate film is from 800 to 20000 seconds,
the contact angle with water of the surface of the second film layer side of the laminate film is from 20 to 80°,
the surface strength of the thermosensitive adhesive layer is from 0.6 to 1.7 kg-cm,
the second film layer comprises from 28 to 57% by weight of a thermoplastic resin and from 43 to 72% by weight of an inorganic fine powder surface-treated with surface-treating agent,
the second film layer is porous, and the thermosensitive adhesive layer is formed on the surface of the second film layer side of the laminate film in the state that a part of the thermosensitive adhesive contained in the thermosensitive adhesive layer is absorbed into the second film layer,
the thermosensitive adhesive layer comprises an ethylene-vinyl acetate copolymer,
a coating amount of the thermosensitive adhesive layer is from 1 to 5 g/m² after drying, and
a water absorption volume of the second film layer as measured according to "Japan TAPPI No. 51:2000" is from 1.8 to 5 ml/m².

2. The thermosensitive adhesive label according to claim 1, wherein the surface of the first film layer side of the laminate film is printable.

3. The thermosensitive adhesive label according to claim 1, wherein:
the first film layer comprises from 40 to 100% by weight of a thermoplastic resin and from 0 to 60% by weight of at least one of an inorganic fine powder and an organic filler.

4. The thermosensitive adhesive label according to claim 3, wherein the surface-treating agent comprises at least one of a water-soluble cationic copolymer and a water-soluble anionic surfactant.

5. The thermosensitive adhesive label according to claim 1, wherein the thermosensitive adhesive layer is activated to become flowable and adhesive when it is heated to a temperature of from 70 to 150° C.

6. The thermosensitive adhesive label according to claim 1, wherein the adhesive strength at peeling is from 0 to 200 gf/15 mm in which the adhesive strength at peeling is measured by preparing 20 sheets of samples by cutting the thermosensitive adhesive label to the size of 80 mm length and 15 mm width, stacking these 20 sheets of samples in such a manner that the surface of the first film layer of one sample is kept in contact with the surface of the thermosensitive adhesive layer of the adjacent sample to give stacked sheets, storing the stacked sheets for 24 hours in an environment at a temperature of 50° C. and a relative humidity of 50% with a load of 500 g/cm$^2$ applied from the lowermost surface and the uppermost surface of the stacked sheets, picking out the set of the eighth sample and the ninth sample from the uppermost surface, the set of the tenth sample and the eleventh sample and the set of twelfth sample and thirteenth sample while the two samples forming each set are in contact, fixing each of the two samples of each set by chucks of a tensile tester, measuring the adhesive strength of each sample at a pulling speed of 50 mm/min, and averaging the measured data.

7. The thermosensitive adhesive label according to claim 1, wherein the first film layer has a multilayer structure.

8. A labeled container with the thermo sensitive adhesive label of claim 1 stuck thereto.

9. The labeled container according to claim 8, wherein the container is made of high-density polyethylene, polypropylene, polyethylene terephthalate, steel, aluminum, glass or ceramics.

10. The labeled container according to claim 8, wherein the container is made of polyethylene terephthalate and the peeling strength of the label in peeling thereof from the container is from 200 to 500 gf/15 mm.

11. A thermosensitive adhesive label comprising:
a laminate film of a first film layer and a second film layer, and
a thermosensitive adhesive layer comprising a thermoplastic resin, a tackifier, and a solid plasticizer on the surface of the second film layer side of the laminate film, wherein:
the Bekk smoothness of the surface of the first film layer side of the laminate film is from 2000 to 20000 seconds,
the Bekk smoothness of the surface of the second film layer side of the laminate film is from 800 to 20000 seconds,
the contact angle with water of the surface of the second film layer side of the laminate film is from 20 to 80°,
the surface strength of the thermosensitive adhesive layer is from 0.6 to 1.7 kg-cm,
the second film layer comprises from 28 to 57% by weight of a thermoplastic resin and from 43 to 72% by weight of an inorganic fine powder surface-treated with surface-treating agent,
the second film layer is porous, and the thermosensitive adhesive layer is formed on the surface of the second film layer side of the laminate film in the state that a part of the thermosensitive adhesive contained in the thermosensitive adhesive layer is absorbed into the second film layer,
the thermosensitive adhesive layer comprises an ethylene-vinyl acetate copolymer,
a coating amount of the thermosensitive adhesive layer is from 1 to 5 g/m$^2$ after drying, and
a water absorption volume of the second film layer as measured according to "Japan TAPPI No. 51:2000" is from 1.0 to 5 ml/m$^2$.

* * * * *